(12) United States Patent
Engesser et al.

(10) Patent No.: US 7,379,267 B2
(45) Date of Patent: May 27, 2008

(54) DISC CLAMP WITH SNAP FIT FOR A DISC DRIVE

(75) Inventors: Martin Engesser, Donaueschingen (DE); Stefan Schwamberger, Hermsdorf (DE)

(73) Assignee: Minebea Co., Ltd., Nagano-ken (JP)

( * ) Notice: Subject to any disclaimer, the term of this patent is extended or adjusted under 35 U.S.C. 154(b) by 360 days.

(21) Appl. No.: 11/200,890

(22) Filed: Aug. 10, 2005

(65) Prior Publication Data
US 2007/0035876 A1   Feb. 15, 2007

(51) Int. Cl.
*G11B 17/02* (2006.01)
(52) U.S. Cl. .................................... 360/99.12
(58) Field of Classification Search ............. 360/98.08, 360/99.12
See application file for complete search history.

(56) References Cited
U.S. PATENT DOCUMENTS

| | | | |
|---|---|---|---|
| 5,590,004 A * | 12/1996 | Boutaghou | 360/99.12 |
| 6,500,060 B2 * | 12/2002 | Hanosh | 451/496 |
| 6,757,132 B1 * | 6/2004 | Watson et al. | 360/99.12 |
| 7,009,809 B2 * | 3/2006 | Hanssen | 360/99.12 |
| 2003/0214751 A1 * | 11/2003 | Hanssen | 360/99.12 |
| 2005/0195524 A1 * | 9/2005 | Choo et al. | 360/99.08 |

* cited by examiner

*Primary Examiner*—Jefferson Evans
(74) *Attorney, Agent, or Firm*—Cooper & Dunham LLP

(57) ABSTRACT

The invention relates to a disc clamp for mounting an information storage disc to a rotating hub of a spindle motor assembly, and a disc drive spindle hub assembly comprising said disc clamp. The disc clamp comprises an annular body portion, an inner centering portion defining a central aperture, and an annular outer peripheral clamping portion. The inner centering portion having a series of centering tabs disposed about an inner circumference of the body portion. Each centering tab includes a first tab portion extending substantially perpendicular to the body portion of the clamp, and a second tab end portion extending in an angle from the first tab portion. The centering tabs contacting an inner circumferential surface and being in a snap-fit engagement with the hub The outer peripheral portion contacting the information storage disc when the disc and the clamp are installed on the top portion of the hub.

17 Claims, 2 Drawing Sheets

DISC CLAMP WITH SNAP FIT FOR A DISC DRIVE

FIELD OF THE INVENTION

The present invention generally relates to magnetic disc drives, and particularly to a disc drive clamp for mounting at least one information storage disc on a rotating part of a disc drive spindle motor.

BACKGROUND OF THE INVENTION

Disc drives are data storage devices that store digital data in magnetic form on a rotating information storage disc. Modern disc drives include one or more rigid discs that are coated with a magnetizable medium and mounted on the hub of a spindle motor for rotation at a constant high speed. For being able to reliably reading and writing information on the disc by means of a read/write head it is critical that the information storage disc is well fixed and centered on the hub of the spindle motor.

Spindle motor assemblies often utilize a rotating spindle hub journaled to a non-rotatable spindle shaft. A disc clamp is typically secured to the rotating spindle hub to exert a downward axial force on the mounted information storage disc in order to securely fasten the disc on the hub. Typically, the disc clamp is basically an annular leaf spring that is sized such that its outer rim exerts the downward force through a series of equally spaced screws positioned around the central portion of the clamp and torqued through holes in a central portion of the clamp into the spindle hub. The spaced radial positioning of the screws is beneficial for exerting a distributed clamping force on the disc on the spindle assembly because the force is exerted at the periphery of the clamp in closer proximity to the mounted information storage disc. However, the screw is a discrete source of the clamping force, thus the distribution of the downward force around the periphery of the clamp, against the adjacent disc is exerted in a non-uniform manner. Non-uniform clamping force can generally cause variations in the load force applied and, as a result, can cause the information storage disc to be physically distorted. Distortion of the disc can lead to generation of unacceptable operational errors during recording and reproduction of data on the information storage disc. Further, the use of screws is relative costly.

In a second type of spindle motor assembly the spindle shaft and spindle hub portion both rotate about a bearing sleeve. Here, a single screw can be used to secure the disc clamp to the rotating spindle shaft because the shaft rotates with the screw, as opposed to the non-rotatable shaft where a plurality of screws must be positioned in the hub about the shaft. However, in order to develop a clamping force with a single screw similar to the force developed by the plurality of screws surrounding the non-rotatable shaft, it is necessary to apply a much higher torque to the single screw. This relatively high torque requirement can lead to a number of problems including over-stressing the spindle shaft bearing, stripping threads, and the generation of particles during the torqueing process. These high-torque related problems can damage the bearing and lead to failure of the spindle motor.

Some screw-less disc clamps have been developed in attempts to overcome these shortcomings, but without completely satisfactory results. Such screw-less disc clamps are disclosed in U.S. Pat. Nos. 6,567,238 B1, 6,417,988 B1, and 6,282,054 B1. Other screw-less solutions are known form U.S. Patent Application Publication Nos. 2001/0036038 A1 or 2002/0071206 A1. Often, such screw-less clamps are complicated, and difficult and expensive to manufacture and to mount on the spindle hub.

SUMMARY OF THE INVENTION

It is the object of the present invention, to provide a disc clamp for a disc drive which is simple and cheap to manufacture, and which can be easily and securely mounted on the spindle hub.

In accordance with one preferred embodiment, the invention is implemented as a disc drive spindle hub assembly comprising an annular hub for supporting an information storage disc mounted on a supporting surface of the hub by a disc clamp. The disc clamp having an annular body portion, an inner centering portion defining a central aperture, and an annular outer peripheral clamping portion. The body portion extends above an annular top surface of the hub, the inner centering portion contacting an inner circumferential surface of the hub and centers the disc clamp about the hub when the disc clamp is installed over the hub, and the outer peripheral portion of the clamp engages a top surface of the information storage disc. The centering portion further comprising centering tabs being in a snap-fit engagement with the hub, so that a clamping force is applied through the body portion and the peripheral portion of the clamp against the information storage disc.

In a preferred embodiment of the invention the centering portion comprises a plurality of centering tabs projecting from an inner perimeter of the body portion. Each of the centering tabs including a first tab portion extending substantially perpendicular to the body portion of the clamp, and a second tab end portion extending in an angle from the first tab portion for snap-fit engagement with a corresponding snap surface on the hub.

According to the invention the centering tabs are hook shaped tabs, where the tab end portions are protruding radially outwards from the first tab portions at a right angle or an acute angle.

Preferably, the snap surface on the hub is formed as an annular recess or indentation which is provided on an inner circumferential surface of the hub, wherein the tab end portions of the centering tabs extend into the annular recess. The annular recess may be an annular groove or an annular step on the inner circumference of the hub.

The hub preferably defines an annular flange having a supporting surface for receiving the information storage disc thereon, wherein the disc is secured between the disc clamp and the annular flange.

The invention can be implemented in accordance with another preferred embodiment as a disc clamp for mounting an information storage disc to a rotating hub of a spindle motor assembly. The disc clamp comprises an annular body portion, an inner centering portion defining a central aperture, and an annular outer peripheral clamping portion. The inner centering portion having a series of centering tabs disposed about an inner circumference of the body portion. Each centering tab includes a first tab portion extending substantially perpendicular to the body portion of the clamp, and a second tab end portion extending in an angle from the first tab portion. The centering tabs contacting an inner circumferential surface and being in a snap-fit engagement with the hub. The outer peripheral portion contacting the information storage disc when the disc and the clamp are installed on the top portion of the hub.

In a preferred embodiment, the disc clamp is adapted to be fitted over a top portion of the hub, whereas the second tab end portions are adapted for getting in a snap-fit engagement with a corresponding snap surface on the hub.

According to the invention, the centering tabs are hook shaped tabs, whereas the tab end portions are protruding radially outwards from the first tab portions at a right angle or an acute angle.

The proposed disc clamp is made of resilient material, for example spring steel, which applies a resilient force on the information disc when the clamp is mounted on the hub.

Preferably, the disc clamp is adapted to be fitted over a top portion of the hub. The outer annular peripheral portion having a lower contact surface adapted to contact the information storage disc, whereas the tab portions of the centering tabs are adapted to center the disc clamp on the hub.

The disc clamp according to the invention can be preferably used to secure the storage disc on small and slim hard disc drive spindle motors. The clamp may be made from a low cost metal, plastic, or other material having desired spring rate characteristics. The clamp can be formed into the necessary shape using any method generally known, depending upon the particular type of material being used. For example, a spring steel clamp may be stamped or formed from sheet metal.

These and various other features as well as advantages which characterize the present invention will be apparent from a reading of the following detailed description and a review of the associated drawings.

DETAILED DESCRIPTION OF THE INVENTION

Figure 1:
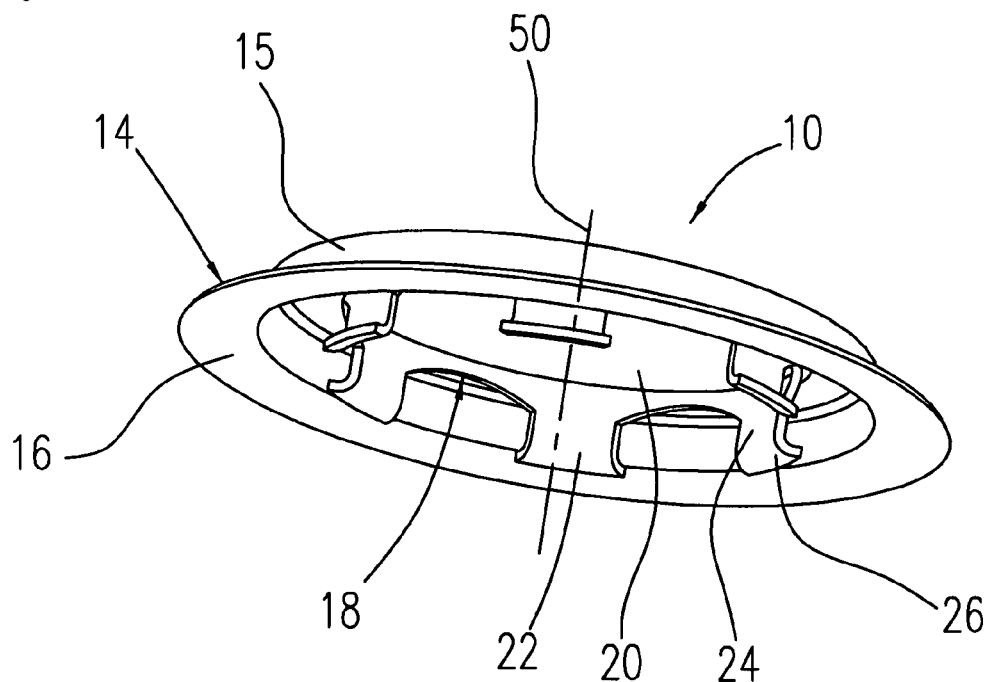
FIG. 1 is a perspective view of a first embodiment of a disc clamp according to the invention.

The disc clamp 10, as shown in FIG. 1, is a spring member having a generally annular shape. The disc clamp 10 consists of an annular body portion 12, an outer peripheral clamping portion 14 and a centering portion 18. The outer clamping portion 14 consists of a first portion 15 protruding substantially perpendicular from the outer rim of the body portion 12 and ending in a lower contact surface 16 which is substantially parallel to the body portion 12.

The disc clamp 10 further includes a centering portion 18 around a central aperture 20. The centering portion comprises a plurality of centering tabs 22 that are connected to the inner periphery of the body portion 12. Preferably, each centering tab 22 is generally hook shaped in cross section.

A first portion 24 of the centering tab 22 extend downwardly substantially perpendicular to the body portion 12 defining the boundary of the central aperture 20. A second tab end portion 26 connects in an angle to the end of the first tab portion 24 and extends radially outwards towards the clamping portion 14.

Figure 2:
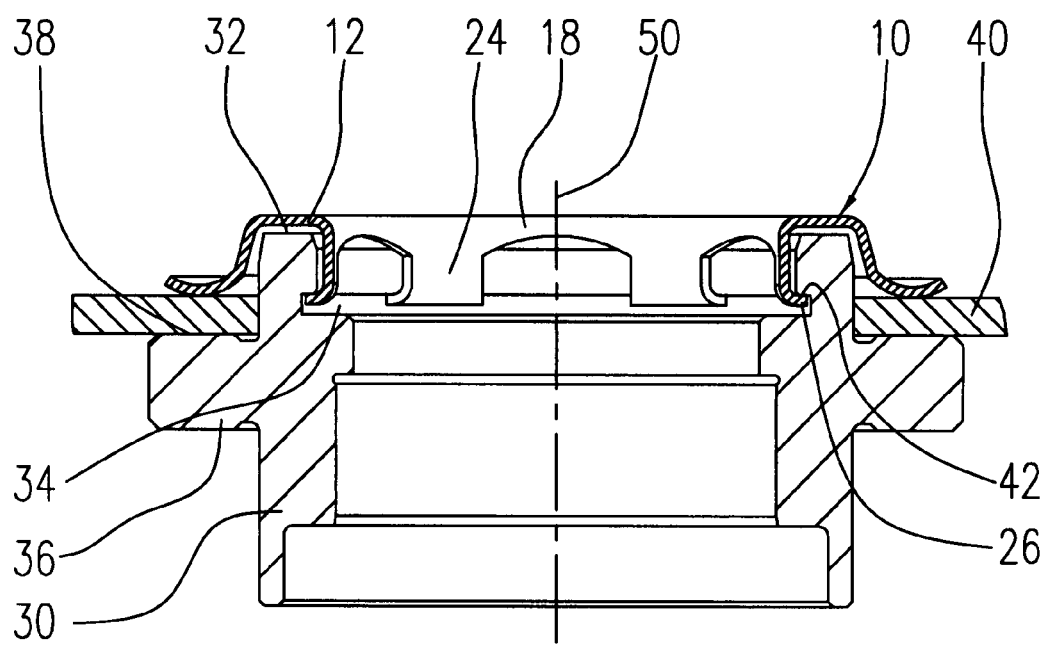
FIG. 2 is a sectional view of a disc drive hub assembly, incorporating the disc clamp of FIG. 1 which covers or encompasses parts of the hub and engages at the inner periphery of the hub.

A number of six centering tabs 22 are shown in FIGS. 1 and 2. However, it should be understood that additional, or fewer centering tabs 22 can be used in other embodiments depending on the size of the hub assembly and the required clamping force.

The disc clamp 10 is preferably made from a resilient sheet material such as a spring steel that can transfer a force between the contact surface 16 and the end tab portions 22. Preferably, the disc clamp 10 has a good degree of elasticity, such that the clamp can be bent by exerting an external force but will regain its original shape when the force is removed. A force can be applied through the disc clamp 10 via the tab end portions 22 and the contact surface 16. Preferably, when such a force are applied to the disc clamp 10, it is bent such that the vertical distance between the end portions 22 and the contact surface 16 is decreased. The clamp 10 may be made from a metal, plastic, or other material having desired spring rate characteristics. The clamp 10 can be formed into the necessary shape using any method generally known, depending upon the particular type of material being used. For example, a spring steel clamp may be stamped or formed from sheet metal.

FIG. 2 is a partial cross sectional view of a disc drive spindle hub assembly incorporating the disc clamp 10 of FIG. 1. The spindle hub 30 is preferably a generally cylindrical body symmetrical about a spin axis 50. The hub 30 has a cylindrical top portion 32 including an annular recess 34 or groove at its inner circumference. The recess 34 is generally perpendicular to the spin axis 50 of rotation.

Below the top portion 32 of the hub 30 an annular flange 36 extends radially outwards having a top surface 38 which is a disc loading surface for receiving and supporting an information storage disc 40, or in some embodiments, a disc stack made up of a number of alternating discs and spacer rings (not shown). The storage disc 40 has an upper surface and an inner peripheral surface. Preferably, the loading surface 38 is a generally flat surface.

The information storage disc 40 is secured to the hub 30 between the annular flange 38 and the contact surface 16 of the annular disc clamp 10 that is mounted around the top portion 32 of the hub 30. The disc clamp 10 is held in position by the tab end portions 26 of the centering tabs 22 that engages the hub 30, preferably by mating with the annular recess 34 in a snap-fit engagement.

During installation, the outwards facing tab end portions 26 of the centering tabs 22 engage the recess 34 on the inner diameter of the hub 30 and push outward against the hub so as to generally center the clamp 10 about the spindle hub 30. The body portion 12 of the clamp 10 extends radially over the hub top surface 32, preferably without contact with the hub portion. The outer peripheral clamping portion 14 extends downward and outward over the storage disc 40. The lower contact surface of the clamping portion 14 engages the top surface of the storage disc 40.

Once the disc clamp 10 is in position over and on the hub 30, a predetermined downward (axial) pre-load force is applied symmetrically about the spindle axis to the end portions 26 of the tabs 22. The pre-load force axially compresses the disc clamp 10 down on the hub mounted storage disc 40. As the disc clamp 10 is compressed, the centering tabs 22 bend down and extend within the annular recess 34, preferably without contact with the hub top surface 32. As the disc clamp 10 is compressed, the hook shaped centering tabs 22 are pushed downward such that the inwardly projecting tab ends 26 move inwardly to solidly engage the hub recess 34 The centering tabs 22 act to both center the disc clamp 10 about the hub 30 as well as to center and hold the disc 40 about the hub 30.

Figure 3:
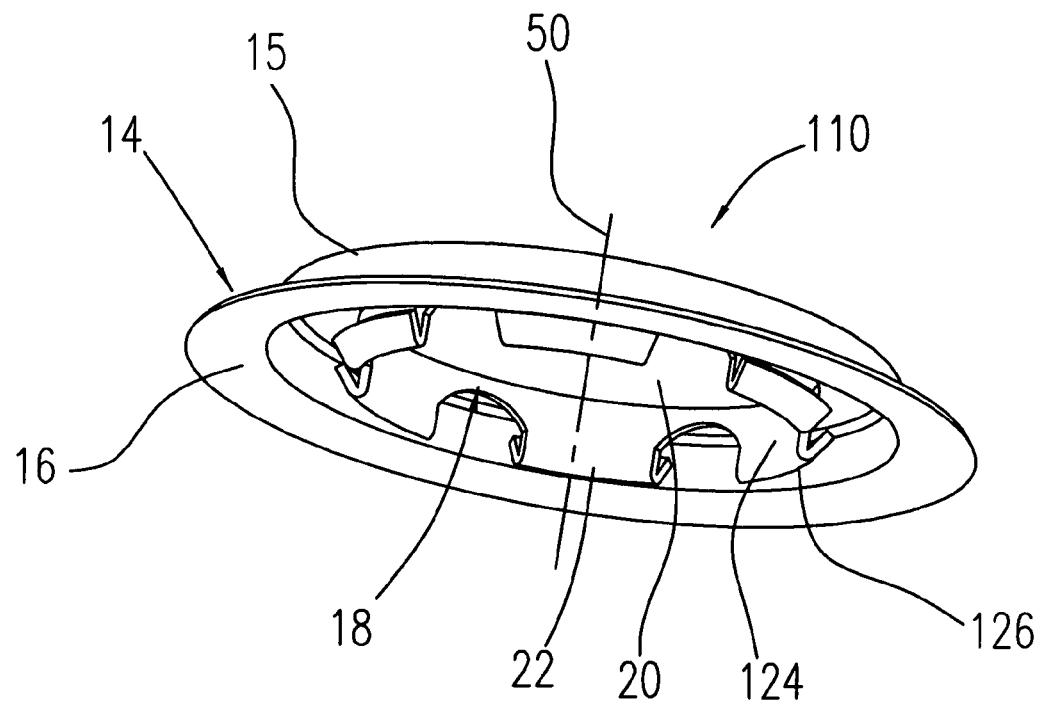
FIG. 3 is a perspective view of a second embodiment of a disc clamp according to the invention.
Figure 4:
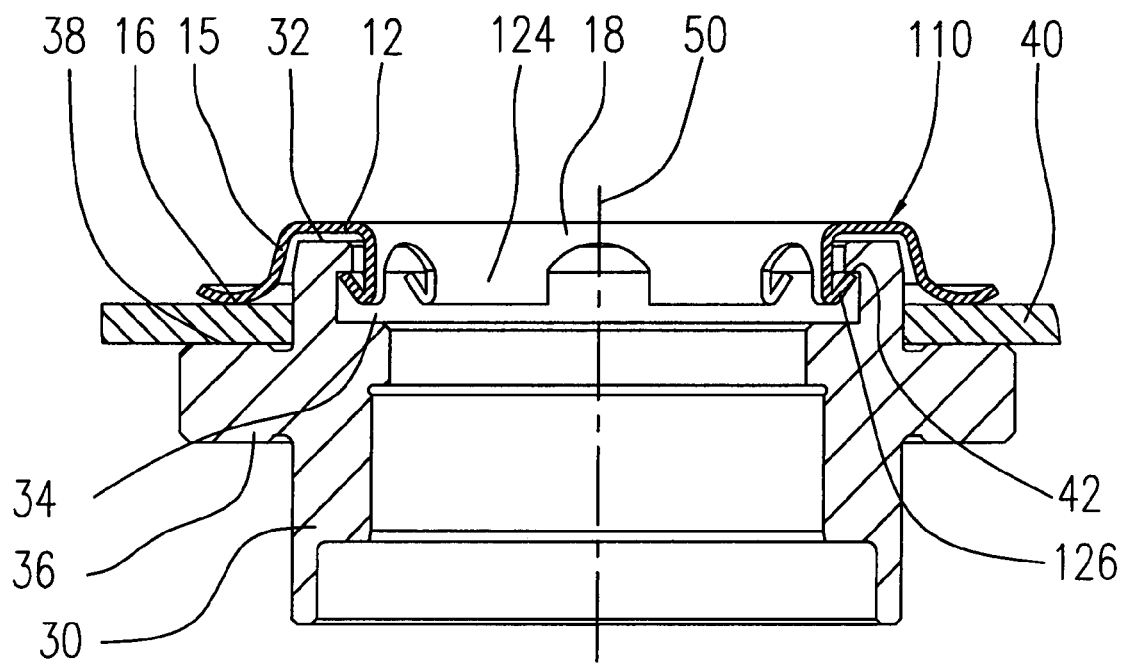
FIG. 4 is a sectional view of a disc drive hub assembly, incorporating the disc clamp of FIG. 3 which covers or encompasses parts of the hub and engages at the inner periphery of the hub.

A second preferred embodiment of a disc clamp 110 in accordance with the present invention is illustrated in FIGS. 3 and 4. The disc clamp 110 of FIGS. 3 and 4 is of the same general structure as the disc clamp of FIGS. 1 and 2, with like reference numerals referring to like elements. However, the annular recess 34 in the top portion of the hub 30 shown in FIGS. 3 and 4 may be slightly different and broader so that it can better mate with and hold the disc clamp 110.

The clamp embodiment of FIGS. 3 and 4 differs from the embodiment of FIGS. 1 and 2 in that the hook shaped end tabs 124 of the centering tabs 22 are extending in an acute angle from the first tab portions 24 for snap-fit engagement with the corresponding snap recess 34 on the hub 30.

The hook shaped end tabs 124 extend upwardly and radially outwards from the tab portions 22 into the recess 34, for example in an angle of about 45 degrees.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art.

Many other modifications, changes and alternatives are also contemplated, and will be apparent to those of skill in the art. Accordingly, all such modifications, changes and alternatives are encompassed in the spirit of the invention disclosed and as defined in the appended claims.

REFERENCE NUMERALS 10 disc clamp
12 body portion
14 clamping portion
15 first portion
16 contact surface
18 centering portion
20 central aperture
22 centering tab
24 first tab portion
26 tab end portion
30 hub
32 top portion (hub)
34 recess (hub)
36 flange
38 top surface (flange)
40 storage disc
42 inner surface (hub)
50 spin axis
110 disc clamp
126 tab end portion

The invention claimed is:

1. A disc drive spindle hub assembly comprising:
an annular hub (30) for supporting an information storage disc (40) mounted on a supporting surface (38) of the hub, a disc clamp (10; 110) having an annular body portion (12), an inner centering portion (18) defining a central aperture (20), and an annular outer peripheral clamping portion (14), wherein the body portion extends above an annular top portion (32) of the hub, the inner centering portion contacting an inner circumferential surface (42) of the hub and centers the disc clamp about the hub when the disc clamp is installed over the hub, and the outer peripheral portion of the clamp engages a top surface of the information storage disc, the centering portion comprising centering tabs (22) being in a snap-fit engagement with the hub, so that a clamping force is applied through the body portion and the peripheral portion of the clamp against the information storage disc.

2. The assembly of claim 1, wherein the centering tabs (22) are hook shaped in cross section.

3. The assembly of claim 1, wherein the centering portion (18) comprises a plurality of centering tabs (22) projecting from an inner perimeter of the body portion (12), each centering tab including a first tab portion (24) extending substantially perpendicular to the body portion of the clamp, and a second tab end portion (26; 126) extending in an angle from the first tab portion for snap-fit engagement with a corresponding snap surface on the hub.

4. The assembly of claim 3, wherein the angle is a right angle.

5. The assembly of claim 3, wherein the angle is an acute angle.

6. The assembly of claim 3, wherein the snap surface on the hub is formed as an annular recess (34) which is provided on an inner circumferential surface of the hub, wherein the tab end portions of the centering tabs extend into the annular recess.

7. The assembly of claim 6, wherein the annular recess comprises an annular groove.

8. The assembly of claim 6, wherein the annular recess comprises an annular step.

9. The assembly of claim 1, wherein the hub defines an annular flange (36) having a supporting surface (38) for receiving the information storage disc (40) thereon, wherein the disc is secured between the disc clamp and the annular flange.

10. A disc clamp (10; 110) for mounting an information storage disc (40) to a rotating hub (30) of a spindle motor assembly, the disc clamp comprising:
an annular body portion (12),
an inner centering portion (18) defining a central aperture (20), and
an annular outer peripheral clamping portion (14) the inner centering portion comprises a plurality of centering tabs (22) disposed about an inner circumference of the body portion, each centering tab includes a first tab portion (24) extending substantially perpendicular to the body portion of the clamp, and a second tab end portion (26) extending in an angle from the first tab portion, the centering tabs (22) contacting an inner circumferential surface (42) and being in a snap-fit engagement with the hub, and the outer peripheral portion contacting the information storage disc when the disc and the clamp are installed on the top portion of the hub.

11. The disc clamp of claim 10, wherein the centering tabs are hook shaped in cross section.

12. The disc clamp of claim 10, wherein the angle is a right angle.

13. The disc clamp of claim 10, wherein the angle is an acute angle.

14. The disc clamp of claim 10, wherein the second tab end portions (26; 126) are adapted for getting in a snap-fit engagement with a corresponding snap surface on the hub.

15. The disc clamp of claim 10, wherein the tab end portions (26; 126) of the centering tabs are projecting substantially radially outwards from the first tab portions.

16. The disc clamp of claim 10, wherein the disc clamp (10; 110) is made of resilient material applying a resilient force on the information disc when the clamp is mounted on the hub.

17. The disc clamp of claim 10, wherein the disc clamp (10; 110) is adapted to be fitted over a top portion (32) of the hub, the outer annular peripheral portion (14) having a bottom contact surface adapted to contact the information storage disc, and the centering tabs (22) are adapted to center the disc clamp on the hub.

* * * * *